Aug. 27, 1963
J. G. KNOWLES
3,101,976
HYDRAULIC BRAKE SYSTEMS
Filed Sept. 19, 1960
FIG. 1
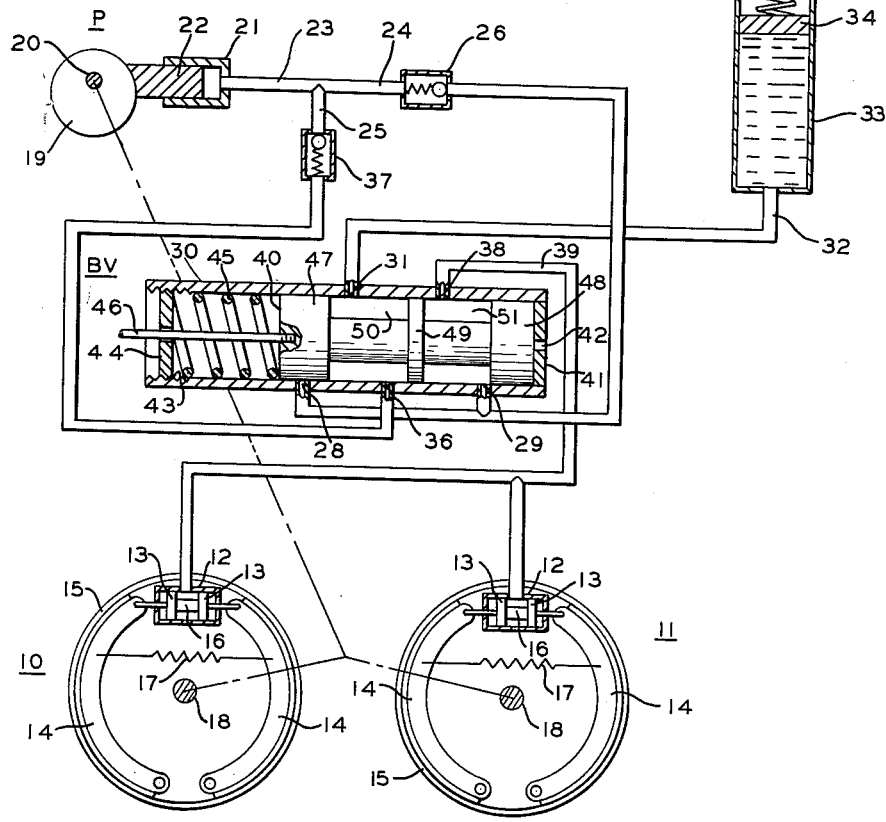
FIG. 2
FIG. 3
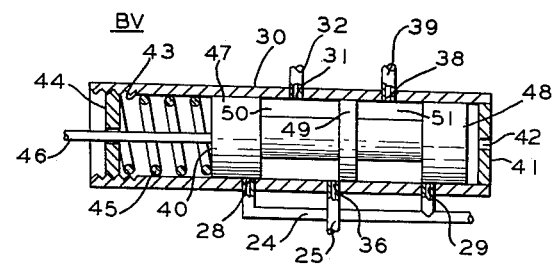
*INVENTOR.*
JOHN G. KNOWLES
BY
*B.T. Wobensmith*
ATTORNEY

United States Patent Office 3,101,976
Patented Aug. 27, 1963

3,101,976
HYDRAULIC BRAKE SYSTEMS
John G. Knowles, 992 Huntingdon Pike,
Huntingdon Valley, Pa.
Filed Sept. 19, 1960, Ser. No. 56,775
7 Claims. (Cl. 303—49)

This invention relates to hydraulic brake systems.

It is the principal object of the present invention to provide an hydraulic brake system that stores up braking force for use when desired and which has a booster included therein.

It is a further object of the present invention to provide, in hydraulic brake systems of the character aforesaid, for automatically replenishing the pressure in the system when the same is depleted.

It is a further object of the present invention to provide a brake system that permits the braking forces to be applied in a smooth and positive manner.

It is a further object of the present invention to provide a brake system that has a simple but effective control valve.

It is a further object of the present invention to provide a brake system that is simple and inexpensive in construction but efficient in operation.

Other objects and advantageous features of the invention will be apparent from the description and claims.

The nature and characteristic features of the invention will be more readily understood from the following description, taken in connection with the accompanying drawings forming part thereof, in which FIGURE 1 is a diagrammatic view of an hydraulic brake system in accordance with the invention and showing the control valve in one of its operating positions, and specifically that for return of fluid to the reservoir from the brakes;

FIG. 2 is a fragmentary longitudinal sectional view showing the control valve in another of its operating positions, and specifically that for holding the brakes in a predetermined position; and FIG. 3 is a view similar to FIG. 2 showing the control valve in still another of its operating positions, and specifically that for brake application with stored pressure fluid, further boosted in pressure if the vehicle is moving.

It should, of course, be understood that the description and drawings herein are illustrative merely, and that various modifications and changes can be made in the structure disclosed without departing from the spirit of the invention.

Referring now more particularly to the drawings, the brake system there illustrated includes a pump P, a brake control valve BV, and wheel brakes 10 and 11, such as those for automotive vehicular wheels with brake cylinders 12, having separable pistons 13 therein for actuating the brake shoes 14 with respect to brake drums 15. The pistons 13 can have stops 16 for limiting the retracting movement effected by springs 17. The wheel shafts are shown at 18 and are mechanically connected in any desired manner, such as by a differential (not shown) and driving shaft 20 to a suitable source of power which may be the engine (not shown) of an automotive vehicle.

The pump P is preferably of the floating piston type and for this purpose includes a cylinder 21 secured at any suitable location with a piston 22 therein. An eccentric disc 19 secured to or driven by the shaft 20 when the vehicle is moving, drives the piston 22.

The cylinder 21 of the pump P has a pipe 23 connected thereto with connected branch lines 24 and 25. The line 24 is provided with an inlet check valve 26 and is connected to spaced ports 28 and 29 in the housing 30 of the valve BV.

The housing 30 also has a port 31 at a predetermined location longitudinally axially between the ports 28 and 29 from which a pipe 32 extends to the reservoir 33. The reservoir 33 preferably has a piston 34 therein with a force storing and applying spring 35 therein.

The housing 30 also has a port 36 at a predetermined location longitudinally axially between the ports 31 and 29 to which the pipe 25 is connected through a delivery check valve 37.

The housing 30 also has a port 38 at a predetermined location longitudinally axially between the ports 36 and 29 to which a pipe 39 is connected. The pipe 39 communicates with the brake cylinders 12.

Within the housing 30 a valve piston 40 is provided which can be stopped at one end against a cylinder head 41, the head 41 having a vent 42 therethrough. The opposite end of the housing 30 is preferably internally threaded as at 43 for the reception of an adjustable spring abutment 44 for engagement against one end of a compression spring 45. The other end of the spring 45 is in engagement with the valve piston 40.

The valve piston 40 has a rod 46 connected thereto for moving the piston 40 against the force of the spring 45 to the desired operating positions.

The valve piston 40 is provided with end sections 47 and 48, a central section 49, and grooved sections 50 and 51 for coaction with the ports 28, 29, 31, 36 and 38.

In the position of the valve piston 40 shown in FIG. 1, communication is established between the ports 38 and 29 by the grooved section 51 and between the ports 36 and 31 by the grooved section 50. The port 28 is cut off by the end section 47.

In the position of the valve piston 40 shown in FIG. 2, communication is shut off at the ports 28 and 29 so that the portion of the system including the pipe 39, and the brake cylinders 12 is cut off and sealed and communication is established by the grooved section 50 between the port 36 and the port 31.

In the position of the valve piston 40 shown in FIG. 3, the port 29 is cut off by the end section 48. Communication is established between the ports 31 and 28 by the grooved section 50 and between the ports 36 and 39 by the grooved section 51.

The mode of operation will now be pointed out.

Assuming first that the valve piston 40 of the valve BV is in the position shown in FIG. 1, any fluid under pressure tends to be returned from the brake cylinders 12, assisted by the action of the springs 17, the fluid passing through the pipe 39, the grooved portion 51, the port 29, the pipe 24, and the check valve 26 to the cylinder 21 of the pump P. If the shaft 20 is rotating the eccentric disc 19 will tend to reciprocate the piston 22 so long as there is sufficient back pressure through the check valve 26 to supply fluid to the cylinder 21. Liquid from the pump P is delivered through the pipe 23 and the pipe 25 with its check valve 37 to the port 36 through the grooved section 50, the port 31 and the pipe 32 to the reservoir 33 for charging the same with fluid under pressure. The check valve 37 is effective to prevent back flow of fluid to the pump P.

If now it is desired to apply the brakes, the rod 46 is moved to position the piston 40 of the valve BV as shown in FIG. 3. In this position fluid under pressure, and at the elevated storage pressure, is immediately delivered from the reservoir 33 through the pipe 32, the port 31, the grooved section 50, the port 28, the pipe 24, through the check valve 26, the pipe 25 through the check valve 37, the grooved section 51, the port 38 and pipe 39 to the brake cylinders 12 and against the pistons 13, for brake application.

Assuming that the shaft 20 is rotating, the pump P acts as a booster for increasing the pressure of the fluid effective for brake application.

If now it is desired to hold the brakes 10 and 11, the rod 46 is moved to position the valve piston 40 of the brake valve BV as shown in FIG. 2. In this position, the piston 40 by reason of the grooved section 51 being disposed in isolating relation to the port 39, return of brake fluid or further delivery of brake fluid with respect to the pipe 39 is prevented, thereby to maintain the existing conditions. The pump P is connected through the port 36, the grooved section 50, the port 31 and the pipe 32 to the reservoir 33 for returning pressure fluid to the reservoir 33 and increasing the pressure thereof.

For increased holding, the piston 40 can again be moved to the position shown in FIG. 3.

For release of the brakes, the rod 46 can be moved to permit the piston 40 to return to the position shown in FIG. 1.

It will be noted that the booster action of the pump P which is not required when the shaft 20 is not rotating is not employed. The reservoir storage pressure in the reservoir 33 is sufficient for brake application under static conditions.

It will also be noted that the system, as a closed circuit, provides a controlled action of the pump P in that if fluid under pressure is not available to the pump P the piston 22, by reason of its floating action, is not reciprocated and does not cause the pressure to rise to excessive levels.

I claim:

1. Hydraulic brake apparatus for vehicles having wheel brakes and a driving shaft connected to the wheels comprising fluid pressure responsive brake operating members for the wheels, a storage reservoir for brake fluid under pressure, a pump having a driving portion actuated by said shaft, a control valve having a housing, a first fluid connection between said reservoir and said control valve housing, a second fluid connection for the passage of fluid therethrough in either direction between said control valve housing and said brake operating members, a supply fluid connection from said control valve housing to said pump having a non-return valve therein, a delivery fluid connection from said pump to said control valve housing having a non-return valve therein, and a valve member in said housing and forming part of said control valve having portions establishing communication at one position between said second fluid connection and said supply fluid connection and establishing communication between said delivery fluid connection and said first fluid connection for the return of fluid to said reservoir through said first fluid connection, and at another position establishing communication between said first fluid connection and said supply fluid connection and between said delivery fluid connection and said second fluid connection for brake application.

2. Hydraulic brake apparatus as defined in claim 1 in which said pump has a cylinder and a floating piston in said cylinder moved to engagement with said driving portion by fluid pressure applied thereagainst from said supply fluid connection.

3. Hydraulic brake apparatus for vehicles having wheel brakes and a driving shaft connected to the wheels comprising fluid pressure responsive brake operating members for the wheels, a storage reservoir for brake fluid under pressure, a pump having a driving portion actuated by said shaft, a control valve having a housing, a first fluid connection between said reservoir and said control valve housing, a second fluid connection for the passage of fluid therethrough in either direction between said control valve housing and said brake operating members, a supply fluid connection from said control valve housing to said pump having a non-return valve therein, a delivery fluid connection from said pump to said control valve housing having a non-return valve therein, said supply and delivery connections being in communication at said pump, and a valve member in said housing forming part of said control valve having portions establishing communication at one position between said delivery fluid connection and said first fluid connection with said second fluid connection blocked, and at another position establishing communication between said first fluid connection and said supply fluid connection and between said delivery fluid connection and said second fluid connection for brake application.

4. Hydraulic brake apparatus as defined in claim 3 in which said pump has a cylinder and a floating piston in said cylinder moved to engagement with said driving portion by fluid pressure applied thereagainst from said supply fluid connection.

5. Hydraulic brake apparatus for vehicles having wheel brakes and a driving shaft connected to the wheels comprising fluid pressure responsive brake operating members for the wheels, a storage reservoir for brake fluid under pressure, a pump having a driving portion actuated by said shaft, a control valve having a housing, a first fluid connection between said reservoir and said control valve housing, a second fluid connection for the passage of fluid therethrough in either direction between said control valve housing and said brake operating members, a supply fluid connection from said control valve housing to said pump having a non-return valve therein, a delivery fluid connection from said pump to said control valve housing having a non-return valve therein, said supply and delivery connections being in communication at said pump, and a valve member in said housing forming part of said control valve having portions establishing communication at one position between said second fluid connection and said supply fluid connection and between said delivery fluid connection and said first fluid connection for the return of fluid to said reservoir through said first fluid connection, at another position establishing communication between said delivery fluid connection and said first fluid connection with said second fluid connection blocked, and at another position establishing communication between said first fluid connection and said supply fluid connection and between said delivery fluid connection and said second fluid connection for brake application.

6. Hydraulic brake apparatus as defined in claim 5 in which said pump has a cylinder and a floating piston in said cylinder moved to engagement with said driving portion by fluid pressure applied thereagainst from said supply fluid connection.

7. Hydraulic brake apparatus as defined in claim 5 in which said valve member includes a cylindrical portion with grooved sections having equal and opposite areas exposed to fluid pressure to provide a balanced pressure application thereon of fluid pressure available from said connections.

References Cited in the file of this patent

UNITED STATES PATENTS

| | | |
|---|---|---|
| 2,317,846 | Campbell | Apr. 27, 1943 |
| 2,396,897 | Stelzer | Mar. 19, 1946 |
| 2,718,437 | Henning | Sept. 20, 1955 |
| 2,752,947 | Hruska | July 3, 1956 |